United States Patent [19]

McDonald et al.

[11] Patent Number: 5,625,655

[45] Date of Patent: Apr. 29, 1997

[54] FUEL TRANSFER TUBE QUICK OPERATING REMOTE CLOSURE DEVICE

[75] Inventors: Francis X. McDonald, Enfield; Scott A. Kendrick, Colchester, both of Conn.; Edward F. Lamoureux, Hampden, Mass.; Peter Leombruni, Wethersfield, Conn.; Edward G. Sirica, East Hartford, Conn.; Frank J. Formanek, W. Suffield, Conn.

[73] Assignee: Combustion Engineering, Inc., Windsor, Conn.

[21] Appl. No.: 282,895

[22] Filed: Jul. 29, 1994

[51] Int. Cl.$^6$ ............................. G21C 13/073
[52] U.S. Cl. ................ 376/203; 376/204; 376/260; 376/261; 49/395; 220/324; 292/32; 292/37; 292/256.5
[58] Field of Search ................... 376/260, 261, 376/203, 204; 220/324; 292/32, 37, 256.5; 114/117, 118, 201 R, 203; 49/395, 68

[56] References Cited

U.S. PATENT DOCUMENTS

| | | | |
|---|---|---|---|
| 2,219,137 | 10/1940 | Moon | 220/57 |
| 2,690,144 | 9/1954 | Ellis et al. | 109/59 |
| 3,140,730 | 7/1964 | Costes | 138/89 |
| 3,353,566 | 11/1967 | Cepkauskas et al. | 138/89 |
| 3,449,860 | 6/1969 | Franks, Jr. et al. | 49/317 |
| 3,694,145 | 9/1972 | Stevens | 21/91 |
| 3,760,618 | 9/1973 | Wiczer | 70/92 |
| 4,519,519 | 5/1985 | Meuschke et al. | 220/211 |
| 4,559,880 | 12/1985 | Lacka | 109/51 |
| 4,678,620 | 7/1987 | Marshall et al. | 376/203 |
| 4,690,795 | 9/1987 | Hardin, Jr. et al. | 376/264 |
| 4,928,615 | 5/1990 | Williams | 114/203 |
| 4,971,369 | 11/1990 | Jean | 292/36 |

FOREIGN PATENT DOCUMENTS

| | | | |
|---|---|---|---|
| 797954 | 1/1981 | U.S.S.R. | 114/201 R |
| 6999 | of 1907 | United Kingdom | 114/203 |
| 493909 | 10/1938 | United Kingdom | 292/37 |

OTHER PUBLICATIONS

Bulletin EP–19085 of Nuclear Energy Services entitled, "Fuel Transfer Tube Quick Closure", 1985.

Primary Examiner—Charles T. Jordan
Assistant Examiner—Chrisman D. Carroll
Attorney, Agent, or Firm—L. James Ristas; John H. Mulholland

[57] ABSTRACT

A nuclear power plant fuel transfer tube quick operating remote closure device (10) comprised of a reducing ring (20) and a cover assembly (60). The reducing ring (20) is bolted to the transfer tube housing flange (12). Rotation of a chuck key advances jaws on the cover assembly (60) which feed closure latches (78) into a groove (40) on the reducing ring (20). The upper surface (80) of each latch (78) has a bevelled surface (82) corresponding to a bevelled surface (42) of the groove (40). As the latches (78) engage the groove bevelled surface (42), the entire cover assembly (60) is uniformly drawn toward the reducing ring (20). Machined seal faces (13, 30, 44, 68) and O rings (36, 74) provide a fluid and air tight seal between the transfer tube housing flange (12) and the sealing ring (20) and between the cover assembly (60) and the sealing ring (20). Belleville springs (86) in the latch assemblies (64) allow the latches (78) to move independently as they engage the reducing ring (20), provide a latch preload to compensate for the effects of differential thermal expansion, and allow the cover assembly (60) to be installed simply by turning the mechanical actuator (62) until it is hardstopped.

25 Claims, 5 Drawing Sheets

5,625,655

FUEL TRANSFER TUBE QUICK OPERATING REMOTE CLOSURE DEVICE

BACKGROUND OF THE INVENTION

This invention relates generally to closure devices for large diameter tubes. More particularly, the present invention relates to closure devices for fuel transfer tubes at nuclear power plants.

Nuclear power plant fuel must be kept under water when it is transferred to and from the reactor core to minimize radiation exposure to personnel and equipment. Fuel is transferred to and from the reactor containment via a fuel transfer tube. The fuel transfer tubes are generally designed and constructed to utilize a blind flange closure on the containment side of the tube when the tube is not actively being used. Such blind flange closures utilize a plurality of studs and nuts to mount the closure device to the tube. Installation of the closure device requires that the blind flange be positioned and properly aligned with the studs. Nuts must be threaded on each stud and torqued to a predetermined value. This process is reversed during removal of the closure device. These procedures are time consuming, resulting in high operating costs and high personnel radiation exposure.

In addition, the studs and nuts are subject to cross-threading and galling when the nuts are being installed or removed from the studs. Damaged studs must be replaced to provide a proper seal for the closure device, resulting in additional operating costs and personnel radiation exposure.

SUMMARY OF THE INVENTION

It is thus an object of the present invention to provide a new and improved closure device for nuclear power plant fuel transfer tubes.

It is a particular object of the present invention to provide a new and improved closure device for nuclear power plant fuel transfer tubes that may be installed in less time, thereby reducing operating costs and personnel radiation exposure.

It is a further object of the present invention to provide a new and improved closure device for nuclear power plant fuel transfer tubes that may be installed by remote means, thereby reducing personnel radiation exposure.

It is a yet further object of the present invention to provide a new and improved closure device for nuclear power plant fuel transfer tubes that reduces nut/stud threading operations, thereby reducing operating costs and personnel radiation exposure.

A closure device in accordance with the present invention is comprised of a reducing ring and a cover assembly. The reducing ring is bolted to the transfer tube housing flange generally utilizing the original equipment studs and nuts. The rear face of the reducing ring is machined smooth and has O-rings disposed in a pair of circumferential seal grooves to provide a seal with the transfer tube housing flange. The reducing ring has a laterally facing surface having a circumferential engagement groove.

The cover assembly is comprised of a cover plate, a mechanical actuator, and eight latch assemblies. The rear face of the cover plate is machined smooth and has O-rings disposed in a pair of circumferential seal grooves to provide a seal with a front seal face on the reducing ring. Rotation of a chuck key advances or retracts eight jaws which feed the closure latches into the reducing ring engagement groove. The upper surface of each latch has a bevelled surface corresponding to a bevelled surface of the engagement groove. As the latches engage the engagement groove bevelled surface, the entire cover assembly is uniformly drawn toward the reducing ring, compressing the O-rings to form a seal.

Each closure latch assembly is comprised of a latch and a Belleville spring. The Belleville springs perform several important functions. First the springs allow the latches to move independently as they engage the reducing ring. This promotes self-centering of the cover assembly and precludes a situation where one or two latches engage first, stopping the actuator and preventing other latches from reaching desired seating forces. Secondly, the Belleville springs provide a latch preload to compensate for the effects of differential thermal expansion. Finally, the spring constant of the Belleville springs is designed with a load deflection curve and travel that allows the cover assembly to be installed simply by turning the mechanical actuator until it is hardstopped, eliminating the need for a calibrated torque wrench.

The closure device of the present invention may be remotely installed or removed using readily available plant equipment, such as the crane. Such remote operation greatly reduces personnel radiation exposure.

Other objects and advantages of the invention will become apparent from the drawings and specification.

BRIEF DESCRIPTION OF THE DRAWING

The present invention may be better understood and its numerous objects and advantages will become apparent to those skilled in the art by reference to the accompanying drawings in which.

DETAILED DESCRIPTION OF THE PREFERRED EMBODIMENT

With reference to the drawings wherein like numerals represent like parts throughout the several figures, a fuel transfer tube quick closure device in accordance with the present invention is generally designated by the numeral 10. The closure device 10 is comprised of a reducing ring 20 and a cover assembly 60.

Figure 1:
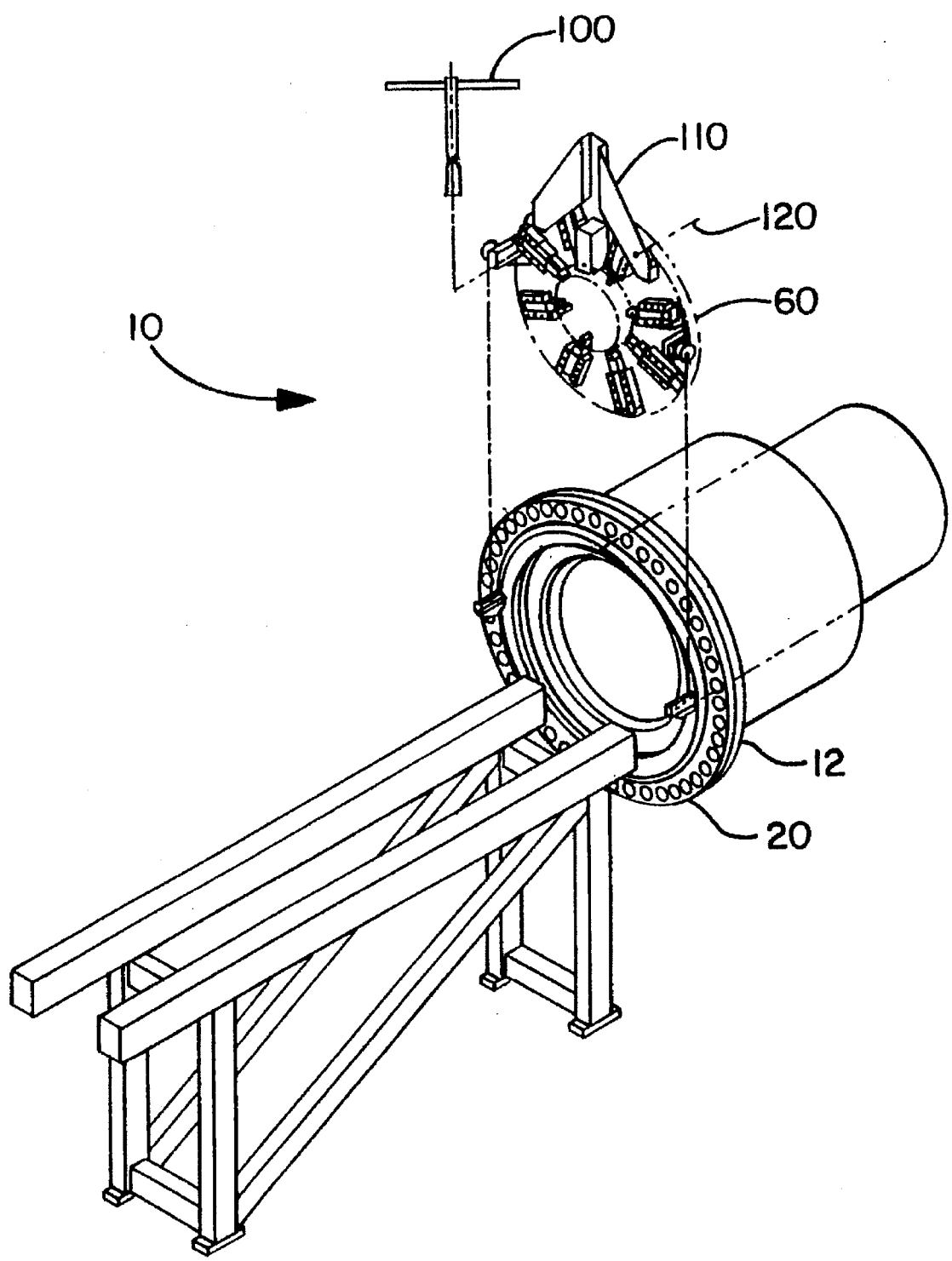
FIG. 1 is a perspective view, partly in phantom, of a quick operating remote closure device in accordance with the present invention.
Figure 3:
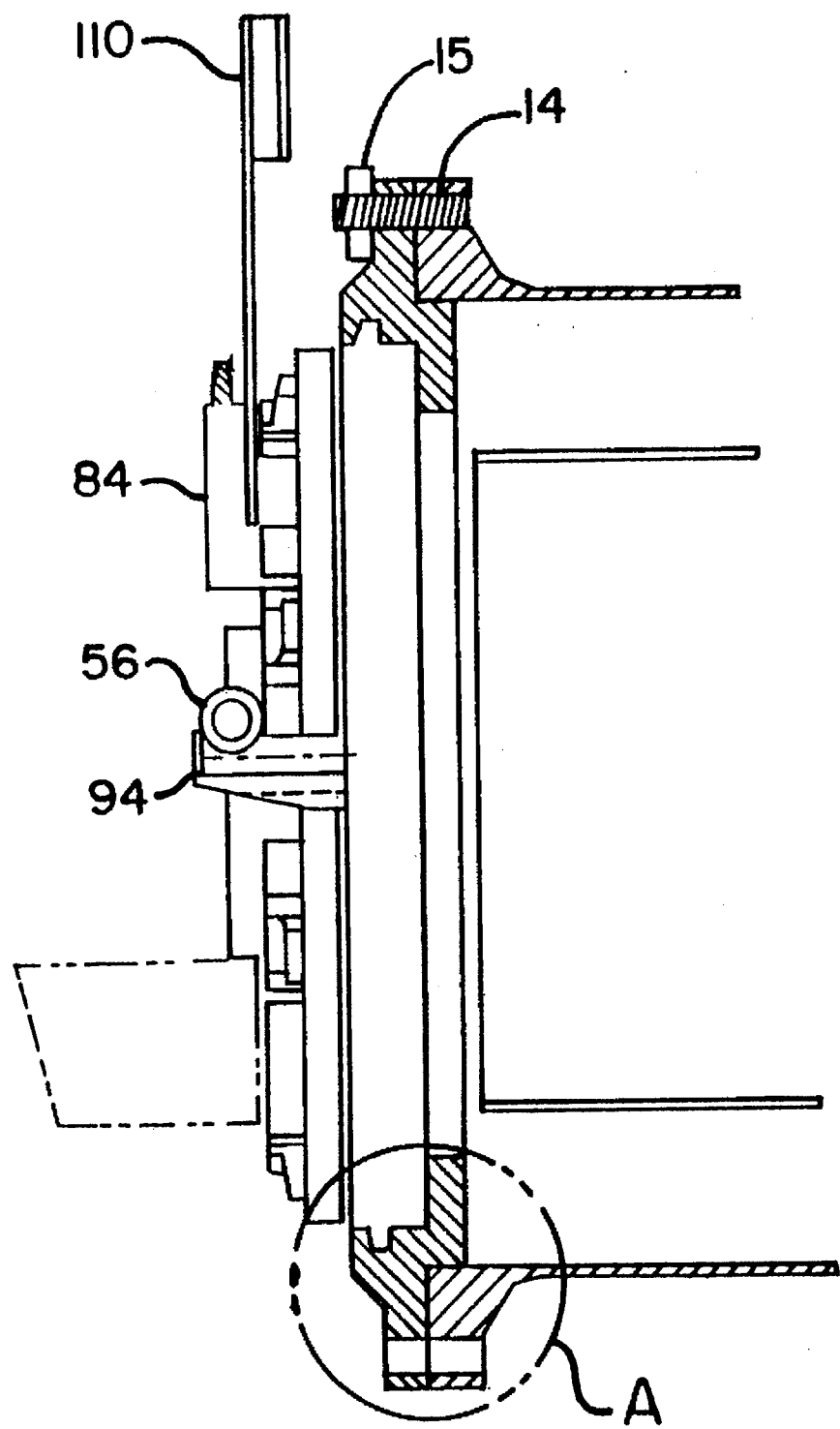
FIG. 3 is an enlarged cross-sectional view of the closure device of FIG. 1 taken through line 3—3 of FIG. 2.
Figure 4:
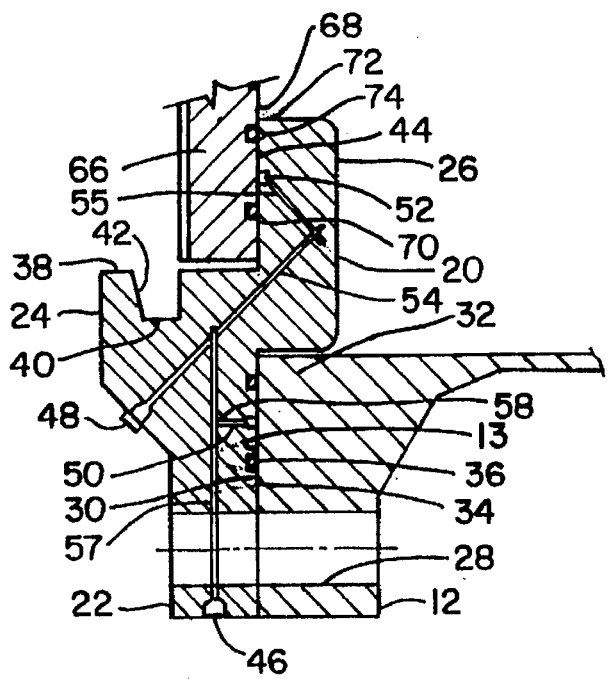
FIG. 4 is an enlarged fragmentary view of section A of FIG. 3.
Figure 5:
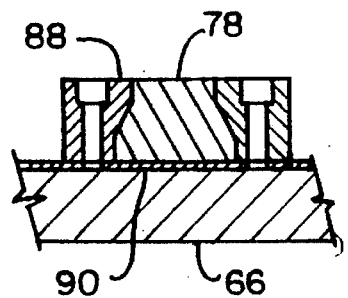
FIG. 5 is an enlarged cross-sectional view of the latch assembly taken through line 5—5 of FIG. 2.

With reference to FIGS. 1, 3 and 4, the reducing ring 20 is bolted to the transfer tube housing flange 12 utilizing the original equipment studs 14 and nuts 15. New studs and nuts may be utilized if the original equipment has been damaged. The ring 20 is comprised of outer, intermediate and inner sections 22, 24, 26. The outer section 22 has a plurality of orifices 28 for receiving the mounting studs 14. The rear face 30 of the outer section 22 is machined to provide a smooth seal with the seal face 13 at the front of the transfer tube housing flange 12. The rear face 30 of the reducing ring outer section 22 has first and second circumferential seal grooves 32, 34. A pair of EPDM O-rings 36 are disposed in the seal grooves 32, 34. The O-rings 36 are compressed when the nuts 15 are tightened on the mounting studs 14 to form a seal. The intermediate section 24 has a laterally (i.e. radially inwardly) facing surface 38 having a circumferential engagement groove 40. The front surface 42 of the engagement groove 40 has a bevelled surface wherein the bottom width of the engagement groove 40 is smaller than the top width. The inner section 26 is situated within the diameter of the transfer tube, in particular the tube flange 12, and has a front seal face 44 that has a machined surface. The front face 44 of the inner section 26 is substantially coplanar (i.e. vertically aligned) with the seal face 13 of the transfer tube housing flange 12.

Figure 2:
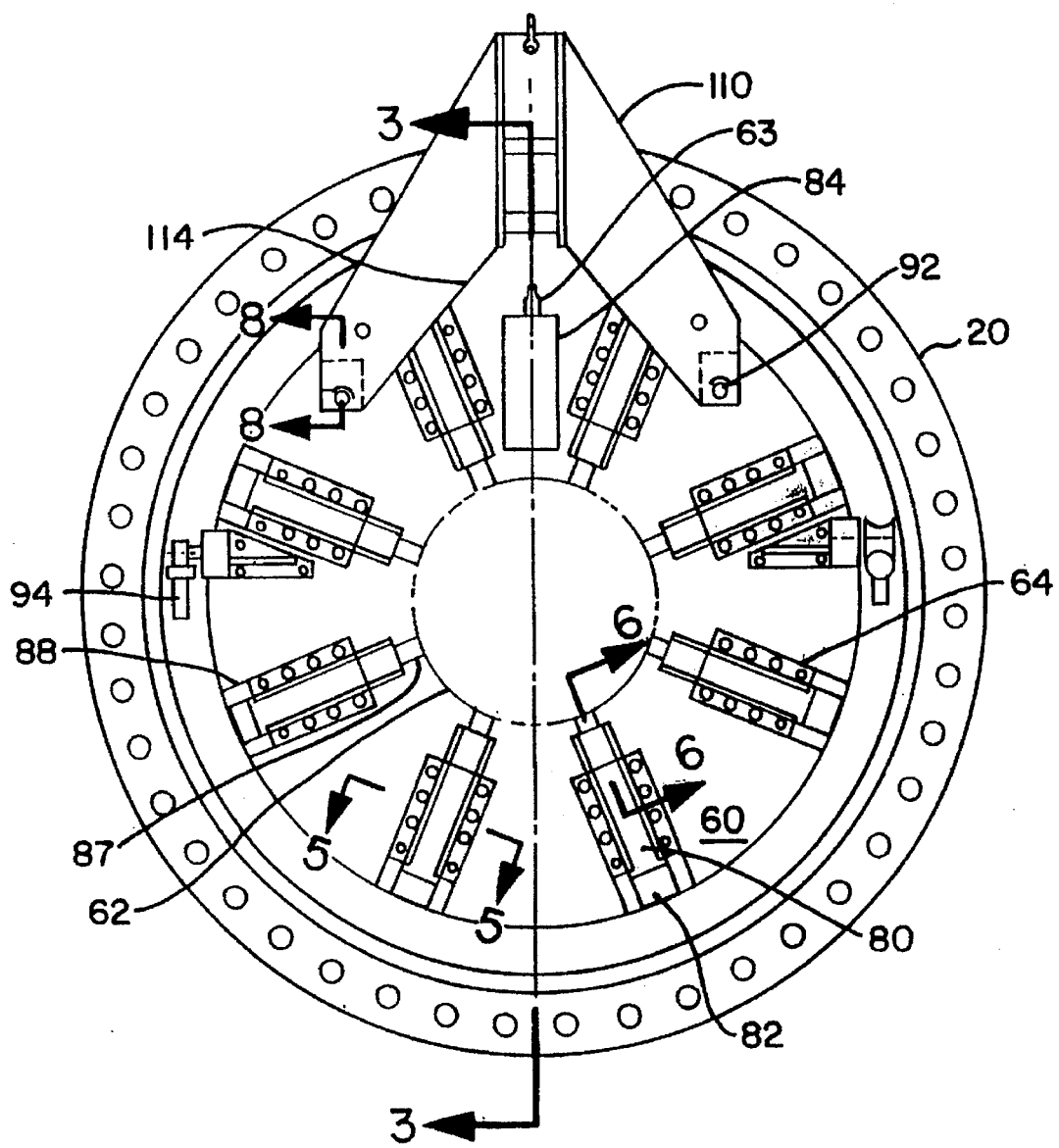
FIG. 2 is an enlarged front view of the closure device of FIG. 1.

With reference to FIGS. 2, 3 and 4, the cover assembly 60 is comprised of a two inch (1.99 cm) thick cover plate 66, a mechanical actuator 62 and eight latch assemblies 64. The rear face 68 of the cover plate 66 is machined and has first and second annular seal grooves 70, 72. A pair of EPDM O-rings 74 are disposed in the seal grooves 70, 72. Rotation of a chuck key advances or retracts eight jaws which feed closure latches 78 into the engagement groove 40 in the reducing ring intermediate section 24. An upper surface 80 of each latch 78 has a bevelled surface 82 corresponding to the bevelled surface 42 of the engagement groove 40. As the latches 78 engage the engagement groove bevelled surface 42, the entire cover assembly 60 is uniformly drawn toward the seal face 44 of the reducing ring inner section 26, compressing the O-rings 74 to form a seal.

The mechanical actuator 62 is a mechanism similar to a scroll jaw chuck commonly used on lathes and other machine tools. The actuator 62 generally consists of a scroll plate on bearing supports with a square scroll thread on one side and a helical gear on the other side. Jaws contained within the ways translate radially with scroll plate rotation through teeth that interface with the scroll thread. The plate is rotated by turning a chuck key which meshes with the scroll plate through an integral gear. The chuck key is connected to an offset drive gearbox 84. The gearbox 84 locates the key at a convenient point for remote actuation of the chuck. The gear reducer minimizes the torque that must be applied to operate the chuck with the remote pole 100.

Each closure latch assembly 64 is comprised of a latch 78, an engagement member 87 and a Belleville spring 86. Each latch 78 is retained by guides 88 and bears against the cover plate 66 via a slide plate 90. The latches 78 are composed of 17-4 Ph steel or similar material. The slide plates 90 are composed of Nitronic 60 steel or similar material having excellent wear and low friction coefficient properties. The bevelled surface 82 of each latch 78 is machined to match the bevelled surface 42 of the reducing ring engagement groove 40. The latch bevelled surface 82 may be chrome plated to preclude galling and to minimize wear. Each latch 78 has a blind axial bore 89. The engagement member 87 and Belleville spring 86 are housed in the blind bore 89. The engagement member 87 has first and second end sections 93, 97 wherein the diameter of the second end section is greater than the diameter of the first end section, defining a shoulder 91. The Belleville spring 86 is disposed around the first end section 93 of the engagement member 87 and bears against the engagement member shoulder 91 and the end wall 96 of the blind bore 89. The Belleville spring 86 biases a second end 95 of the engagement member 87 out of the blind bore 89 and into engagement with the actuator 62.

Figure 6:
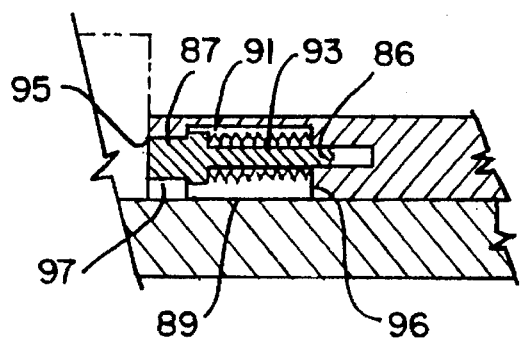
FIG. 6 is a fragmentary cross-sectional view of the latch assembly of FIG. 5 taken through line 6—6 of FIG. 2.
Figure 7:
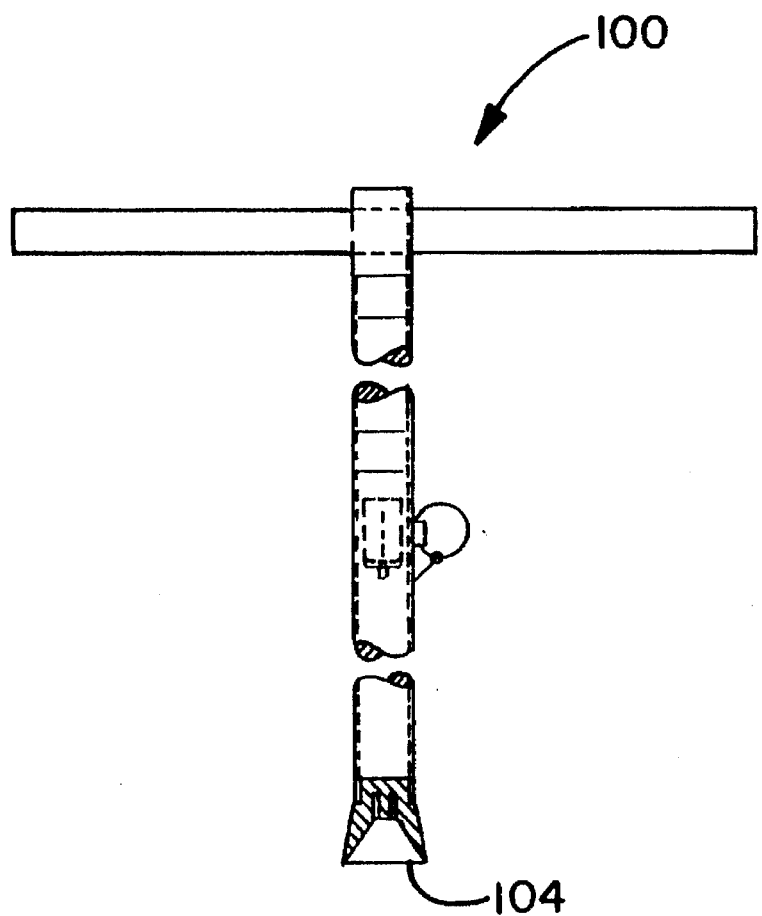
FIG. 7 is an enlarged view of the operator pole of FIG. 1.
Figure 8:
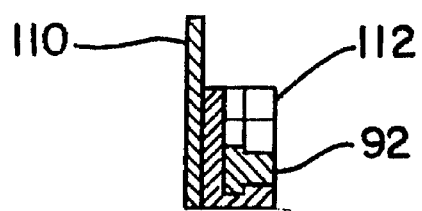
FIG. 8 is an enlarged cross-sectional view of the cover assembly lifting lug and lifting plate taken through line 8—8 of FIG. 2.

The Belleville springs 86 perform several important design functions. First the springs 86 allow the latches 78 to move independently as they engage the reducing ring 20. This promotes self-centering of the cover assembly 60 and precludes a situation where one or two latches engage first, stopping the actuator and preventing other latches from reaching desired seating forces. The Belleville springs 86 may not be necessary in smaller cover designs of this type. Secondly, the Belleville springs 86 provide a latch preload to compensate for the effects of differential thermal expansion. For normal conditions there is not a significant change in temperature between installation and plant operation. However, at 370° F. Loss of Coolant Accident/Main Steam Line Break conditions, diametrical expansion of the transfer tube housing flange and retaining ring would result in some loss of installation preload were there no spring element present. Finally, the spring constant of the Belleville springs is designed with a load deflection curve and travel that allows the cover assembly 60 to be installed simply by turning the mechanical actuator 62 until it is hardstopped. Therefore, there is no need for a calibrated torque wrench. Each Belleville spring 86 may be comprised of a single spring, as shown in FIG. 6 or be comprised of a plurality of springs in parallel or series sets within the latch assembly 64.

The reducing ring 20 has two leak connections 46, 48 to allow testing of the reducing ring 20 to transfer tube housing flange 12 and the cover assembly 60 to reducing ring 20 O-ring sets 36, 74, as shown in FIG. 4. The rear face 30 of the reducing ring outer section 22 has an annular test groove 50 located intermediate the first and second annular seal grooves 32, 34. The front sealing face 44 of the reducing ring inner section 26 has a annular test groove 52 that is positioned intermediate the first and second seal grooves 70, 72 on the cover plate rear face 68 when the cover assembly 60 is installed. The reducing ring rear face test groove 50 and the front sealing face test groove 52 are in fluid communication with the leak connections 46, 48 via internal bores 54, 55, 57, 58. The reducing ring 20 to transfer tube housing flange 12 seal and the cover assembly 60 to reducing ring 20 seal may be leak tested via the leak connections 46, 48, the bores 54 and the test grooves 50, 52.

The cover assembly 60 installs quickly, reducing operating costs and minimizing personnel radiation exposure. The reducing ring 20 is permanently installed. The installation procedure is substantially the same as that for the original equipment closure. The O-rings 74 for the cover assembly 60 are generally replaced prior to each installation of the cover assembly 60. Prior to installation, the latches 78 are verified to be in the fully retracted position.

A crane (not shown) and a lifting plate 110 are utilized to position the cover assembly 60. The lifting plate 110 contains slots 112 which engage lugs 92 on the cover assembly 60. The lifting plate 110 is offset to clear the reducing ring 20 and to locate the pick point in line with the center of gravity of the cover assembly 60. A lifting line (not shown) is connected to the top center of the lifting plate 110. Tag lines 120 are connected to the outboard ends of the lifting plate 110.

The cover assembly 60 is lifted and lowered by the crane until the closure plate guide follower 94 contacts the reducing ring follower guide 56. Guidance of the cover assembly 60 is achieved by using tag lines 120. Once centered, the crane is moved back until the cover assembly 60 is within the retaining ring 20.

Once in position, the remote pole 100 is used to turn the actuator mechanism 62. The pole 100 has a steady rest/support (not shown) that attaches to the bridge handrail and a safety lanyard. The pole 100 is lowered by hand until the guide funnel 104 is positioned over the mechanical actuator hex nut 63. A cutout feature 114 in the lift plate 110 facilitates this operation by further acting to guide the guide funnel 104 into position.

The actuator 62 is then rotated using the pole 100. Outward movement of the latches 78 causes the latches 78 to engage the retaining ring engagement groove 40, drawing the cover assembly 60 into position. Pole rotation is continued until hardstop, which will correlate with a predetermined number of turns of the pole 100. The assembly 10 may be leak tested to ensure proper sealing of the mating surfaces.

The cover assembly 60 is removed by reversing the above procedure. The lifting plate 110 is lowered and engaged on the cover lugs 92. The crane is adjusted to load the spring hanger to equal the cover weight. The latches are then released. Crane movement away from the reducing ring 20 will free the cover assembly 60 for removal.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A quick operating remote closure device for a fuel transfer tube having a mounting surface and a plurality of threaded mounting studs projecting therefrom, said device comprising:

ring means mounted on the fuel transfer tube, said ring means comprising a structural member having first and second concentric annular front surfaces, a third, back surface which abuts the fuel transfer tube mounting surface and a plurality of orifices for receiving the transfer tube studs, said first surface comprising an annular groove having a bevelled surface;

a plurality of nut means mounted on the transfer tube studs for securing said ring means to the transfer tube whereby said third surface sealingly abuts said mounting surface; and cover means mountable on said ring means, said cover means comprising a cover having front and back surfaces, wherein said cover back surface sealingly abuts said ring means second surface when said cover means is mounted on said ring means, and said cover means has latch means mounted thereon and latch actuator means for moving said latch means from an unlatched position to a latched position, said latch means engaging said groove of the ring means first surface when said latch means is in said latched position.

2. The device of claim 1 wherein said latch means comprises a plurality of latches, each of said latches comprising a first end portion having a bevelled surface, wherein said latch first end portion surface bears against said groove bevelled surface whereby said cover means back surface is drawn into tight engagement with said ring means second surface when said latch means is moved into said latched position.

3. The device of claim 2 wherein each of said latch means further comprises means for reducing friction between said latch and said cover second surface, said friction reducing means comprising a slide plate, said slide plate being disposed between a said latch and said cover means front surface.

4. The device of claim 3 wherein said slide plates are composed of Nitronic 60™ material.

5. The device of claim 4 wherein each of said latches is composed of 17-4 Ph material.

6. The device of claim 2 wherein the groove of the ring first surface faces radially inward; each of said latches extends along a respective radially oriented axis and comprises an engagement member and spring means, wherein said spring means biases said engagement member toward said actuator means.

7. The device of claim 6 wherein the latch includes a blind axial bore, having, an open end and the engagement member and the spring means are disposed in said bore and wherein said bore has a wall end, said engagement member comprising a first end portion and a second end portion, said first end portion having a diameter D1, said second end portion having a diameter D2 wherein D1 is greater than D2, whereby D1 and D2 define a shoulder portion, said spring means being disposed around said engagement member second end portion, said spring means having a first end bearing against said engagement member shoulder and a second end bearing against said bore wall end, whereby said spring means biases said engagement member first end into contact with said actuator means.

8. The device of claim 7 wherein said spring means comprises a Belleville spring, said spring having a load deflection curve and travel such that the latch means is moved to said latched position by operating said actuator means until all of said spring means are fully compressed and said actuator means is hardstopped.

9. The device of claim 1 wherein said ring means third surface comprises first, second and third annular grooves.

10. The device of claim 9 wherein said ring means further comprises a first O-ring mounted in said first groove and a second O-ring mounted in said second groove.

11. The device of claim 10 wherein said cover means back surface comprises first and second annular grooves.

12. The device of claim 11 wherein said cover means further comprises a first O-ring mounted in said first groove and a second O-ring mounted in said second groove.

13. The device of claim 12 wherein said ring means structural member further comprises a fourth annular groove disposed in said ring means second surface and a first blind bore, said first blind bore having an end in fluid communication with said ring means fourth groove, a second blind bore having an end in fluid communication with said ring means third groove, and third and fourth blind bores in fluid communication with said first and second blind bores, said third and fourth blind bores each having an open end and plug means disposed in said open end.

14. The device of claim 1 further comprising operator means engageable with said actuator means for operating said actuator means.

15. The device of claim 1 further comprising transport means engageable with said cover means for transporting said cover means.

16. A quick operating remote closure system for a fuel transfer tube having an annular mounting surface comprising:

ring means on the fuel transfer tube, said ring means comprising a structural member in the form of a reducing ring having concentric first and second front surfaces and a third, back surface, said first surface having an annular groove, said groove having a bevelled surface, and said second front surface being situated within the tube;

nut means for securing the ring means to the mounting surface of the transfer tube;

cover means mountable on said ring means, said cover means comprising a cover having front and back surfaces, wherein said cover back surface engages said ring means second surface when said cover means is mounted on said ring means, said cover means further comprising latch means rigidly mounted on said cover means front surface and actuator means for moving said latch means from an unlatched position to a latched position, said latch means comprising a plurality of latches, each of said latches having a first end portion having a bevelled surface, wherein said latch first end portion surface bears against said groove bevelled surface whereby said cover means back surface is drawn into tight engagement with said ring means second surface when said latch means is moved into said latched position;

operator means engageable with said actuator means for remotely operating said actuator means; and transport means engageable with said cover means for positioning said cover means in alignment with said ring means.

17. The device of claim 16 wherein each of said latches defines an axis and a blind axial bore having an open end and a wall end, each of said latches comprising an engagement member and spring means disposed in said bore, said engagement member having a first end, a first end portion and a second end portion, said first end portion having a diameter D1, said second end portion having a diameter D2 wherein D1 is greater than D2, whereby D1 and D2 define a shoulder portion, said spring means being disposed around said engagement member second end portion, said spring means having a first end bearing against said engagement member shoulder and a second end bearing against said bore wall end, whereby said spring means biases said engagement member first end out of said bore open end and into engagement with said actuator means.

18. The device of claim 17 wherein said spring means comprises a Belleville spring, said spring having a load deflection curve and travel such that the latch means is moved to said latched position by operating said actuator means until all of said spring means are fully compressed and said actuator means is hardstopped.

19. The device of claim 16 wherein said ring means third surface comprises first, second and third annular grooves and said cover means back surface comprises first and second annular grooves, said device further comprises first, second, third and fourth O-rings, said first O-ring being mounted in said ring means third surface first groove, said second O-ring being mounted in said ring means third surface second groove, said third O-ring being mounted in said cover means back surface first groove, and said fourth O-ring being mounted in said cover means back surface second groove.

20. The device of claim 19 wherein said ring means structural member further comprises a fourth annular groove disposed in said ring means second surface and a first blind bore, said first blind bore having an end in fluid communication with said ring means fourth groove, a second blind bore having an end in fluid communication with said ring means third groove, and third and fourth blind bores in fluid communication with said first and second blind bores, said third and fourth blind bores each having an open end and plug means disposed in said open end.

21. The device of claim 1, wherein said ring means is a reducing ring having said second front surface situated within the tube when the ring means is secured by the nut means to the mounting surface of the transfer tube.

22. The device of claim 1, wherein said ring means is a reducing ring, having said second front surface situated within the tube when the ring means is secured by the nut means to the mounting surface of the transfer tube.

23. A quick operating remote closure device for a fuel transfer tube having a mounting surface and a plurality of threaded mounting studs projecting therefrom, said device comprising:

ring means mounted on the fuel transfer tube, said ring means comprising a structural member having first and second concentric annular front surfaces and a plurality of orifices for receiving the transfer tube studs, said first surface comprising an annular groove having a bevelled surface;

a plurality of nut means mounted on the transfer tube studs for securing said ring means to the transfer tube;

cover means mountable on said ring means, said cover means comprising a cover having front and back surfaces, wherein said cover back surface sealingly abuts said ring means second surface when said cover means is mounted on said ring means, and said cover means has latch means mounted thereon and latch actuator means for moving said latch means from an unlatched position to a latched position, said latch means engaging said groove of the ring means first surface when said latch means is in said latched position; and operator means engageable with said actuator means, for operating said actuator means.

24. The device of claim 23, further comprising transport means engageable with said cover means, for transporting said cover means.

25. A quick operating remote closure device for a fuel transfer tube having a mounting surface and a plurality of threaded mounting studs projecting therefrom, said device comprising:

ring means mounted on the fuel transfer tube, said ring means comprising a structural member having first and second concentric annular front surfaces and a plurality of orifices for receiving the transfer tube studs, said first surface comprising an annular groove having a bevelled surface;

a plurality of nut means mounted on the transfer tube studs for securing said ring means to the transfer tube;

cover means mountable on said ring means, said cover means comprising a cover having front and back surfaces, wherein said cover back surface sealingly abuts said ring means second surface when said cover means is mounted on said ring means, and said cover means has latch means mounted thereon and latch actuator means for moving said latch means from an unlatched position to a latched position, said latch means engaging said groove of the ring means first surface when said latch means is in said latched position;

wherein said ring means is a reducing ring having said second front surface situated within the tube when the ring means is secured by the nut means to the mounting surface of the transfer tube.

* * * * *